(12) United States Patent
Park et al.

(10) Patent No.: US 10,087,300 B2
(45) Date of Patent: Oct. 2, 2018

(54) METHOD FOR THE PREPARATION OF PLA BEAD FOAMS

(71) Applicant: SYNBRA TECHNOLOGY B.V., Etten-Leur (NL)

(72) Inventors: Chul B. Park, Etobicoke (CA); Mohammadreza Nofar, Montreal (CA)

(73) Assignee: Synbra Technology B.V., NM Etten-Leur (NL)

( * ) Notice: Subject to any disclaimer, the term of this patent is extended or adjusted under 35 U.S.C. 154(b) by 149 days.

(21) Appl. No.: 14/780,940

(22) PCT Filed: Mar. 28, 2013

(86) PCT No.: PCT/NL2013/050231
§ 371 (c)(1),
(2) Date: Sep. 28, 2015

(87) PCT Pub. No.: WO2014/158014
PCT Pub. Date: Oct. 2, 2014

(65) Prior Publication Data
US 2016/0039990 A1    Feb. 11, 2016

(51) Int. Cl.
| | | |
|---|---|---|
| *C08J 9/12* | (2006.01) | |
| *C08J 9/232* | (2006.01) | |
| *C08J 9/18* | (2006.01) | |
| *C08J 9/22* | (2006.01) | |
| *C08L 67/04* | (2006.01) | |
| *C08J 9/36* | (2006.01) | |

(52) U.S. Cl.
CPC ............... *C08J 9/232* (2013.01); *C08J 9/122* (2013.01); *C08J 9/18* (2013.01); *C08J 9/22* (2013.01); *C08J 9/36* (2013.01); *C08L 67/04* (2013.01); *C08J 2203/06* (2013.01); *C08J 2367/04* (2013.01); *C08J 2423/00* (2013.01); *C08J 2467/00* (2013.01)

(58) Field of Classification Search
CPC ....... C08J 9/122; C08J 9/18; C08J 9/22; C08J 9/232; C08J 9/36; C08J 2203/06; C08J 2367/04; C08J 2423/00; C08J 2467/00; C08L 67/04

See application file for complete search history.

(56) References Cited

U.S. PATENT DOCUMENTS

| | | |
|---|---|---|
| 2010/0029793 A1 | 2/2010 | Witt et al. |
| 2013/0059154 A1 | 3/2013 | Shinohara et al. |
| 2013/0288056 A1 | 10/2013 | Shinohara et al. |

FOREIGN PATENT DOCUMENTS

| | | |
|---|---|---|
| EP | 2573133 A1 | 3/2013 |
| EP | 2657279 A1 | 10/2013 |
| EP | 2772509 A1 | 3/2014 |
| EP | 2762521 A1 | 6/2014 |
| EP | 2657279 B1 | 4/2016 |
| EP | 2573133 B1 | 8/2016 |
| JP | 2000-319438 A | 11/2000 |
| JP | 201225869 A | 2/2012 |
| WO | 2011145391 A1 | 11/2011 |
| WO | 2012086305 A1 | 6/2012 |
| WO | 2013047075 A1 | 4/2013 |
| WO | 2013058056 A1 | 4/2013 |

OTHER PUBLICATIONS

JP2016-505426 Notification of Reasons for Refusal, plus translation.

*Primary Examiner* — Irina S Zemel
(74) *Attorney, Agent, or Firm* — Roberts & Roberts, LLP (57) ABSTRACT

The present invention relates to a method for the preparation of PLA beads, more particularly expanded PLA bead foams. In addition, the present invention relates to a method for the preparation of moldings by sintering PLA beads. The method comprises the following steps: A) providing unfoamed PLA pellets, B) heating said unfoamed PLA pellets to an annealing temperature and saturating with a blowing agent, C) maintaining said PLA pellets on the annealing temperature and saturating with said blowing agent, D) depressurizing and cooling the saturated PLA pellets of step C) to room temperature to form expanded PLA bead foams.

15 Claims, 6 Drawing Sheets

Fig 1. DSC heating curves of PLA samples at heating rate of 10°C/min

Fig 2. Double peak investigation of branched PLA samples annealed at various temperature for 60 min.

Fig 3. Double peak investigation of linear PLA samples annealed at various temperature for 60 min.

Fig 4. Double peak investigation of branched PLA samples annealed at 148,5°C for various annealing times Fig 5. Comparison of lower and higher melting peaks of branched PLA in different annealing times and the final crystallinity of the annealed samples Fig 6. Double peak investigation of branched PLA samples annealed at 4 temperatures for 60 min.

Fig 7. Double peak investigation of branched PLA samples annealed at 4 temperatures for 300 min.

Fig 8. Comparison of distance between two peaks of branched PLA when annealed for 60min. and 300min.

Figure 9: Foamed PLA beads saturated at 800 psi $CO_2$ pressure for 15min.-60min. at saturation temperatures of between 120°C-124°C Figure 10. Melting temperatures and crystallinity of branched PLA annealed in different annealing temperatures

| $T_s$ | $T_{mhigh}$ | $T_{mlow}$ | Crystallinity (%) |
|---|---|---|---|
| 140 °C | 151.2 | 138.8 | 28.8 |
| 145 °C | 156.2 | 141.6 | 29.2 |
| 147.5 °C | 158.2 | 144.6 | 29.4 |
| 148.5 °C | 160.9 | 146.5 | 30.1 |
| 150 °C | 162.2 | 148.5 | 15.3 |

Figure 11. Melting temperatures and crystallinity of linear PLA annealed at various temperatures in DSC

| Ts | Tmhigh | Tmlow | Crystallinity (%) |
|---|---|---|---|
| 143oC | 160.09 | 146.40 | 24.09 |
| 145oC | 160.48 | 146.64 | 16 |
| 147oC | 161.31 | 146.95 | 14.95 |
| 150oC | 162.26 | 147.08 | 9.7 |

METHOD FOR THE PREPARATION OF PLA BEAD FOAMS

The present invention relates to a method for the preparation of PLA bead foams, more particularly expanded PLA bead foams. In addition, the present invention relates to a method for the preparation of moldings by sintering PLA bead foams.

Expanded polymeric bead foams are of those undegradable polymers that are broadly utilized in packaging, and thermal and sound insulation applications and more advanced applications in areas such as automotive production. In all cases, the physical and mechanical properties of bead foams are very important to get a final high quality product. Also, it is very important to achieve good inter-bead bonding and well sintering, since the bead boundaries are the crack initiation locations.

Expanded polystyrene (EPS), expanded polyethylene (EPE), and expanded polypropylene (EPP) are of those well known bead foams that are being utilized in a large scale at the current market. Based on their mechanical and physical properties, they can be used in various applications. Polylactide or Poly (lactic acid) (PLA) is one of the polymers that have increased interests due to its renewable sources, biocompatibility, and biodegradability, acceptable mechanical and thermal properties. Expanded PLA (EPLA) can be a very good substitute for EPS for commodity applications however, one of the most challenging issues these days is the crystallization behavior of PLA, which takes place very slowly and can have a significant effect on manufacturing PLA bead foams. Therefore, it is highly important to improve the PLA crystallization and hence the foaming properties in order to achieve high quality beads with well cohesion.

PLA is a thermoplastic aliphatic polyester polymer derived from such renewable resources as cornstarch and sugarcane. It is also degradable in the environment where petroleum-based polymers do not degrade. During recent years, PLA has received increased attention as a potential substitute for polystyrene (PS) products Currently, expanded PS (EPS) bead foams are widely used in various applications such as packaging, thermal and sound insulation, construction, and cushioning. Thereby PLA bead foams can be a suitable substitute for these EPS products in that EPS is not biodegradable and is environmentally unfriendly.

Although few companies are currently producing expanded PLA (EPLA) bead foams, good sintering among the beads to manufacture three-dimensional final foam products with strong mechanical properties is still a serious challenge.

An object of the present invention is to achieve a final desirable 3-dimensional bead foam by creating a double crystal melting peak during the foaming process.

The present method for preparation of expanded PLA bead foams comprises the following steps:

A) providing unfoamed PLA pellets,

B) heating said unfoamed PLA pellets to an annealing temperature and saturating with a blowing agent, C) maintaining said PLA pellets on the annealing temperature and saturating with said blowing agent, D) depressurizing and cooling the saturated PLA pellets of step C to room temperature to form expanded PLA bead foams.

The present inventors assume that the first crystal melting peak is the result of defective crystal melts at lower temperatures and in bead structures that behave as fusing of individual beads and adhesion during the processing. However, the second peak protects the shape of foamed beads. The newly generated crystal peak during the isothermal gas-impregnation stage, i.e. the saturation with a blowing agent, stems from the perfection of crystal phase out of unmelted crystals, which has a higher orientation and a higher melting temperature than the original peak. The melting temperature of this peak is typically above the annealing temperature. The present inventors assume that when the temperature increases up to the annealing point, the less perfect crystals get melted and the more perfect crystals existing above the annealing temperature remains unmelted. Then, during the isothermal treatment, the $T_{mhigh}$ from unmelted crystals gets larger with higher perfection and thicker lamellae, whereas the portion of the first peak that forms during the cooling process decreases since, more crystals have been devoted to the higher melting peak.

The annealing temperature is preferably in the range of 60° C.-180° C.

The annealing time during step C) is preferably in the range of 10 min 300 min.

The PLA pellets in step A) are preferably chosen form the group of linear PLA, branched PLA and PLA copolymers with various D-lactide contents, or combinations thereof.

The PLA pellets in step A) preferably include one or more additives chosen from the group of chain extender, nanoparticles, micro-sized solid particles, fibers, and lubricants.

The PLA pellets in step A) are preferably mixed with polyolefins and/or polyesters.

The present invention further relates to n expanded PLA bead foam having a double crystal melting peak.

According to a preferred embodiment the distance between the two peaks is in the range of 5° C.-25° C., preferably the distance between the two peaks is in the range of 10° C.-20° C.

Such PLA beads are preferably chosen form the group of linear PLA, branched PLA and PLA copolymers with various D-lactide contents, or combinations thereof. According to a preferred embodiment the PLA beads include one or more additives chosen from the group of chain extender, nanoparticles, micro-sized solid particles, fibers, and lubricants. The PLA beads preferably include polyolefins and/or polyesters.

The present invention further relates to a method for the moulding of foam beads in which foamed beads are sintered in the presence of hot air and/or steam, wherein as said foamed beads PLA beads the afore mentioned PLA beads have been used.

The present invention further relates to a foam moulding on basis of sintered PLA beads having a double crystal melting peak.

In addition the present invention relates to the use of such a foam moulding for packaging, thermal and sound insulation, construction, and cushioning purposes.

Improving PLA crystallization is required to achieve the desired double peak structure. This crystallization rearrangement will provide not only the potential of double peak generation favourable for bead sintering, but will also enhance the PLA's inherently poor foaming behavior. Specifically, crystals formed during the saturation step can dramatically affect the PLA bead foams' cell nucleation and expansion behaviors favorably to achieve very high-quality PLA bead foams. The inherently low-melt strength PLA molecules become high-melt strength materials. This is because the PLA molecules become connected through the crystals, which improves the PLA's low-melt strength. Consequently, this increases the PLA's ability to expand by minimizing both the blowing agent loss and the cell coalescence. Since too high a crystallinity will depress the foam's expansioning ability, because of the increased stiffness the degree of crystallinity induced during blowing agent saturation needs to be controlled by selecting the proper saturation temperature and time.

To investigate the evolution of the thermal behavior of Polylactide acid (PLA) in order to manufacture expanded PLA bead foam (EPLA) through batch process, an investigation in regular differential scanning calorimeter (DSC) has been conducted. The influence of various annealing temperatures and time on the double crystal melting peak creation is investigated for a linear and a branched PLA with two various degrees of crystallization rate.

EXPERIMENTAL PROCEDURE

Materials: One commercially-available linear PLA and one long chain branched (LCB) PLA were used in this study. The linear PLA was subsequently modified with 0.5 wt % talc. Branched PLA was prepared by melt extrusion of a linear PLA with 0.7 wt % of an epoxy-based multi-functional chain extender and 0.5 wt % of talc.

Differential Scanning calorimetry (DSC): The effect of the annealing temperature ($T_s$) and time ($t_s$) on the creation and evolution of the double crystal melting peak for linear and branched PLA samples was investigated in a DSC machine using a DSC2000 (TA Instruments). To simulate the batch process for double crystal melting peak creation in absence of blowing agent, samples were heated from room temperature to different annealing temperatures at a heating rate of 30° C./min. Then the samples were annealed for 60 min. to investigate the effect of annealing temperature on the possibility of double crystal melting peak creation of the samples. After annealing at $T_s$, samples were cooled from $T_s$ to room temperature at a rate of 20° C./min and a second heating run was conducted to investigate the effect of annealing on double peak creation by heating the samples with heating rate of 10° C./min to 200° C.

Figure 1:
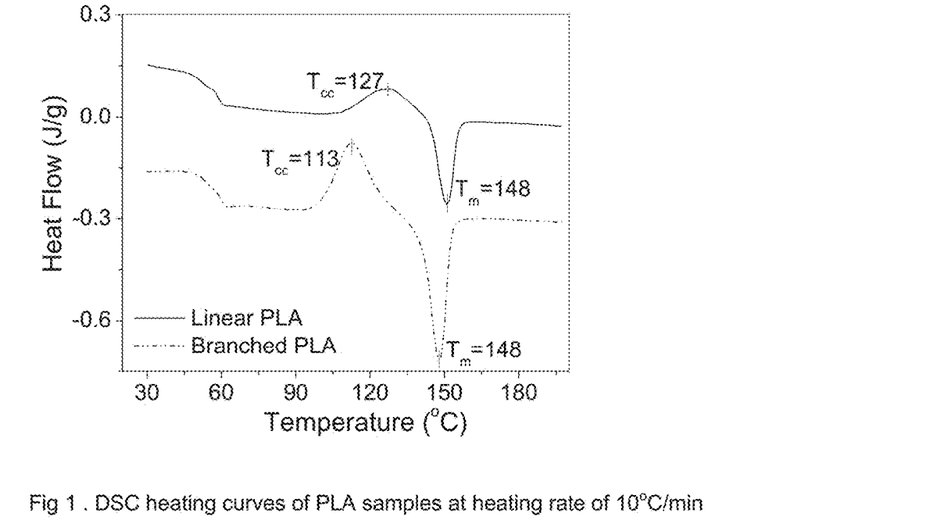
FIG. 1 shows a graphic representation of a DSC heating curves of PLA samples at heating rate of 10° C./min.

FIG. 1

FIG. 1 shows the heating thermographs of linear and branched PLA samples before the annealing process for the simulation purpose. As seen, the melting temperature of both samples is around 148° C. Also, linear PLA shows a cold crystallization peak temperature ($T_{cc}$) higher than branched PLA, due to its slower crystallization kinetics whereas for branched PLA the cold crystals can form much earlier indicating that the branched structure has faster crystallization kinetics due to the role of crystal nucleation of branched structure.

The isothermal annealing process was applied to study the double melting peak formation of both linear and branched PLAs.

Figure 2:
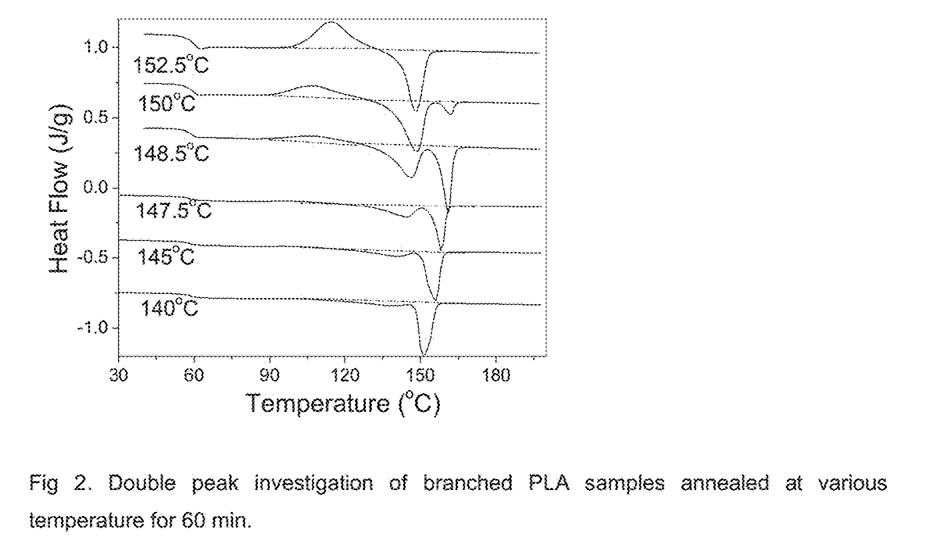
FIG. 2 shows a graphic representation of a double peak investigation of branched PLA samples annealed at various temperature for 60 minutes.

FIG. 2 shows the heating graphs of the branched PLA samples after isothermal annealing at various temperatures for 60 min. As shown, at 140° C. during the isothermal annealing most of the crystals existing within the PLA samples remained unmelted since the annealing temperature is far below the Tm. However, due to annealing at high temperature, the crystal lamellae become thicker and crystal rearrangement occurs and the main melting peak shifts to higher temperature due to crystal perfection. Furthermore, by increasing the annealing temperature to 145° C., during the annealing process some portion of crystals melt and those unmelted crystals start to rearrange and thicker lamellae forms which appears as the second melting peak in FIG. 2 and the first peak appears as a result of cooling process after annealing. These are the crystals that melted during the annealing and now can form during the cooling as the original melting peak (first peak). Additionally increasing the annealing temperature to 150° C., the amount of molten crystals during the annealing process increases and hence smaller amount of unmelted crystals remains during the annealing. Therefore, the major portion of crystals form during the cooling after annealing as the original first peak and the second peak which is the perfected and thicker lamellae becomes smaller. In fact, when the saturation temperature increased, the amount of unmelted crystals decreased and therefore, the second peak would not be as dominant and consequently, the portion of the first peak that formed during the cooling process increased. When increasing the annealing temperature to 152.5° C., the whole existing crystals melt during the annealing process and therefore after cooling process all crystals formed as the first original peak only.

FIG. 2

Figure 10:
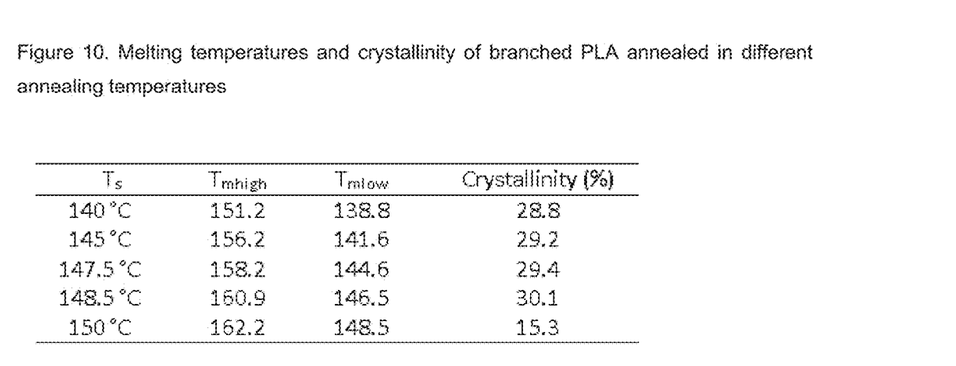
FIG. 10 shows a chart showing melting temperatures and crystallinity of branched PLA annealed in different annealing temperatures.

The results of melting temperatures and degree of crystallinity of the graphs showed in FIG. 2 are shown in FIG. 10. The results depict that double crystal melting peak can be created in branched PLA samples with maximum total crystallinity of around 30% when they are annealed around their melting peak (148° C.).

FIG. 10

Figure 3:
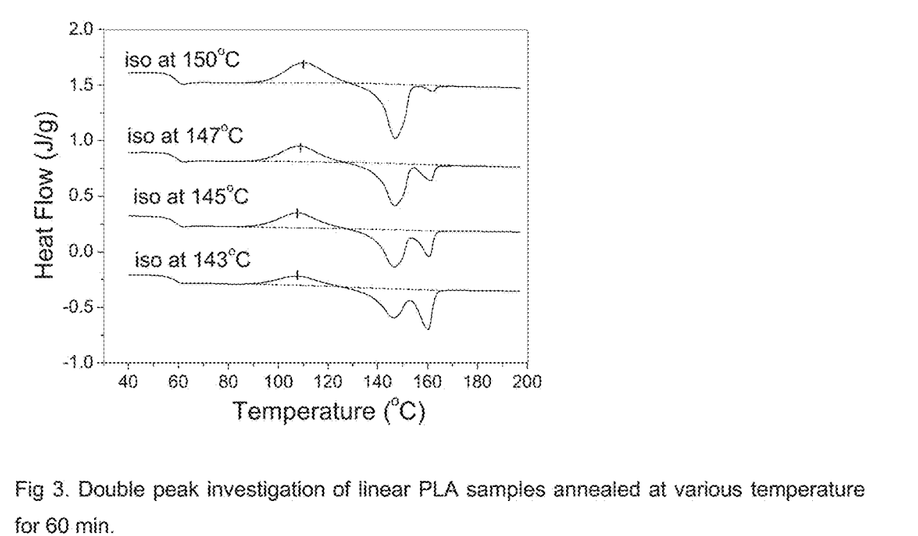
FIG. 3 shows a graphic representation of a double peak investigation of linear PLA samples annealed at various temperature for 60 minutes.

FIG. 3

FIG. 3 shows the heating graphs of the linear PLA samples after isothermal annealing at various temperatures for 60 min. As shown even the linear PLA that has lower crystallizability can results in creation of double peak with reasonably high total crystallinity (FIG. 11) when annealed around 143° C. Similar to branched PLA the second peak appears clearly but around 143° C. probably due to higher chain regularity that exists in linear PLA than branched PLA.

Figure 11:
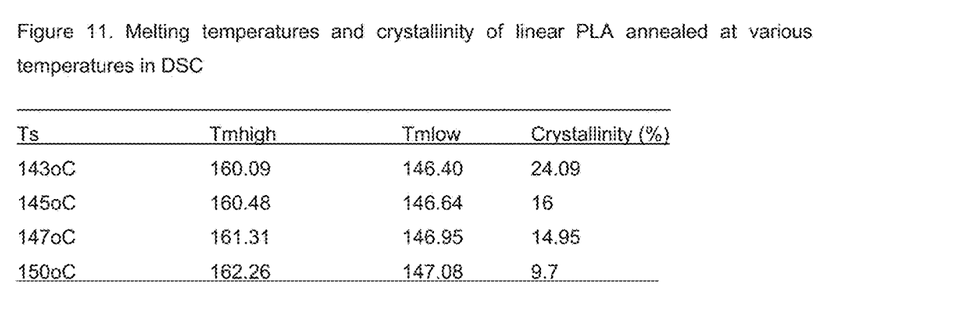
FIG. 11 shows a chart showing melting tempertures and crystallinity of linear PLA annealed at various temperatures in DSC.

According to FIGS. 10 and 11, the created distance between the double peaks is around 15° C. which can be considered as the processing window in steam chest molding manufacturing step.

FIG. 11

Figure 4:
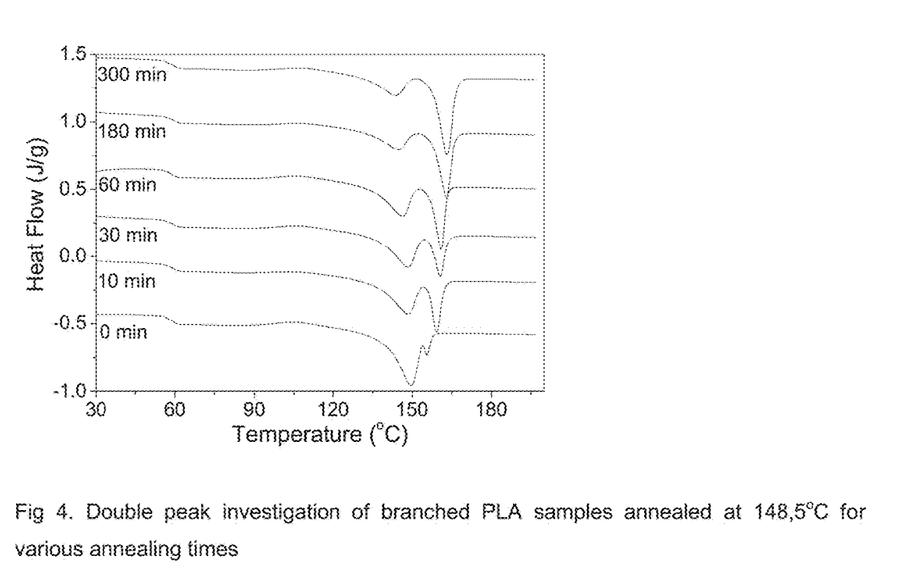
FIG. 4 shows a graphic representation of a double peak investigation of branched PLA samples annealed at 148.5° C. for various annealing times.
Figure 5:
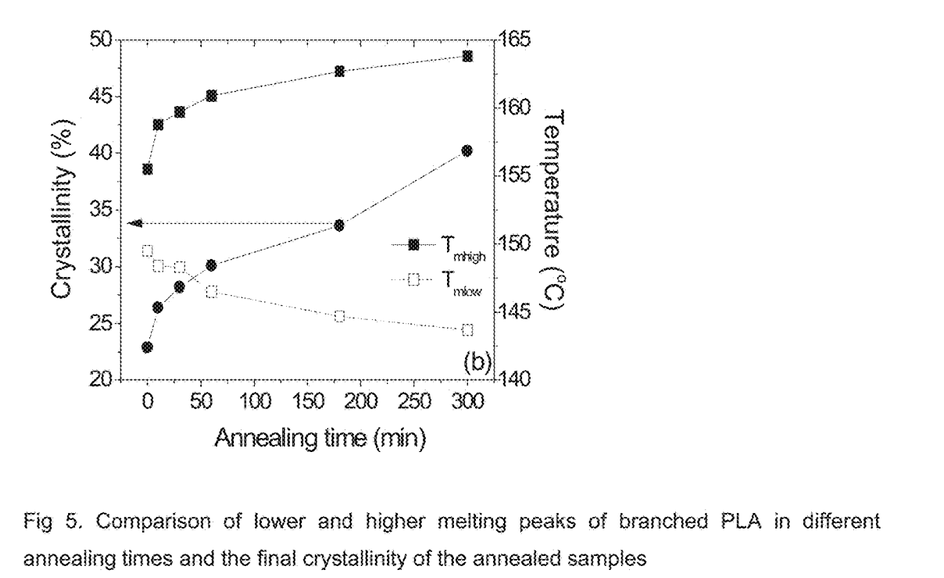
FIG. 5 shows a graphic representation of a Comparison of lower and higher melting peaks of branched PLA in different annealing times and the final crystallinity of the annealed samples.

FIGS. 4 and 5

FIG. 4 presents the results of annealed branched PLA samples at 148.5° C. for various annealing times. When increasing the temperature to $T_s$ and cooling it down right away (0 min.) the unmelted crystals with higher degree of perfection appear as the second peak and the major molten crystals that reform during the cooling process appear as the first peak. By increasing of the annealing time from 10 min. to 300 min., the unmelted crystals that form the second peak receive higher diffusion time to form thicker lamellae and more perfected crystals and therefore less potential crystals remains to be reformed during the cooling process as the first peak. In fact by increasing the annealing time more perfected crystals form and the amount of second peak with higher degree of perfection increases and few crystals can be dedicated for the first peak during the cooling process. In other words, during a longer annealing time, the crystals' perfection was further increased and the second high temperature-melting peak ($T_{mhigh}$) was formed at a higher temperature. In addition, the total crystallinity of the annealed samples was also improved after a longer annealing time. On the other hand, the double peak distance which is critical issue in steam chest molding and shows the processing window is shown in FIG. 5. FIG. 5 shows that during a longer annealing time; the distance between the peaks becomes larger. Because, during longer annealing the second peak forms at higher temperature and therefore its distance from the first peak increases further.

Figure 6:
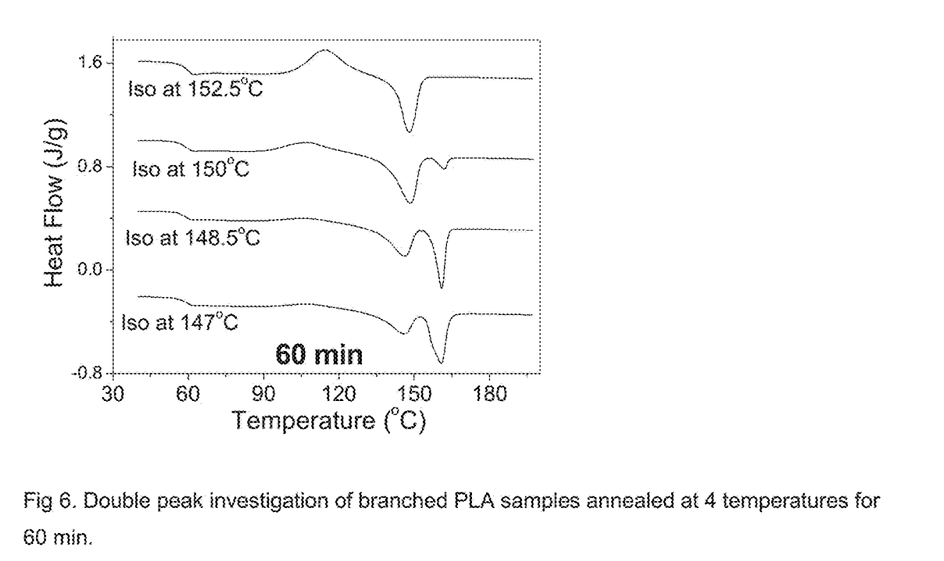
FIG. 6 shows a graphic representation of a double peak investigation of branched PLA samples annealed at 4 temperatures for 60 minutes.
Figure 7:
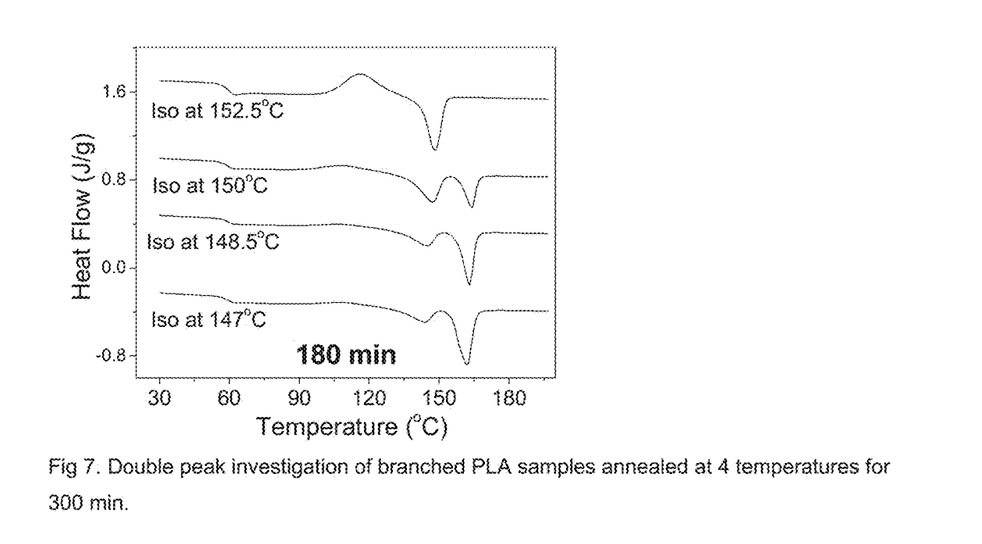
FIG. 7 shows a graphic representation of a double peak investigation of branched PLA samples annealed at 4 temperatures for 300 minutes.

FIGS. 6 and 7

Also, FIGS. 6 and 7 show the results of annealed branched PLA samples at four various annealing temperatures and 60 min. and 180 min., respectively. Considering annealing temperature 150° C. and annealing time 60 min., the major portion of crystals melt during the annealing process and reform during the cooling whereas the second peak representing the perfected crystals has a very small portion. However, when annealing for 180 min. the amount of perfected crystals increases and the second peak grows and the crystallite can be attributed more uniformly in the first and the second peak.

Similar behavior appears for the other annealing temperatures. For instance, at 147° C., although after 60 min. annealing time the second peak forms in a larger content when compared to the first peak, the longer annealing time increases the amount of second crystal melting peak. Increase of annealing temperature to 152.5° C., even after 180 min. still all crystals melt during the annealing and reform as the first peak during the cooling process.

Figure 8:
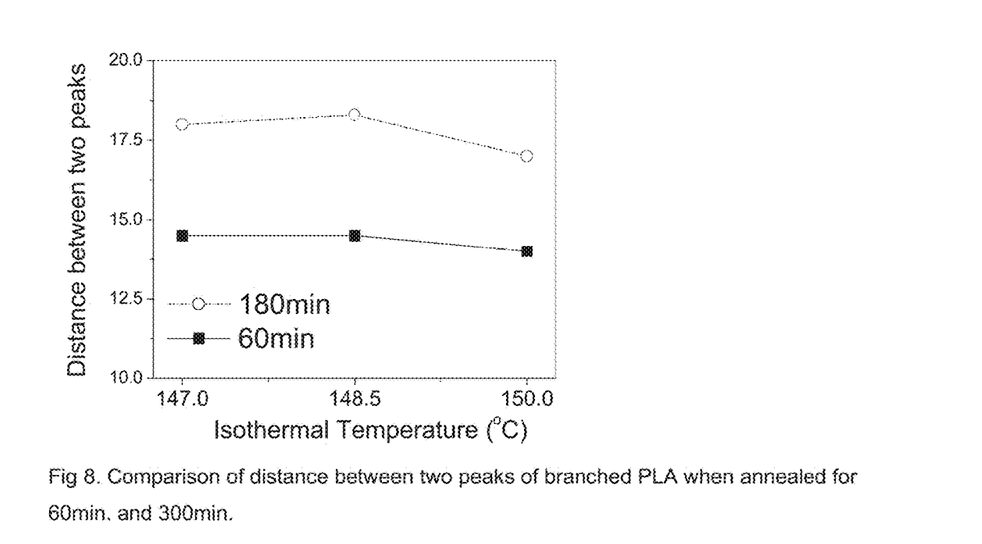
FIG. 8 shows a graphic representation of a comparison of distance between two peaks of branched PLA when annealed for 60 minutes and 300 minutes.

FIG. 8

FIG. 8 shows the distance between two peaks for the annealed samples at three various temperature for 60 min. and 180 min. For all three selected annealing temperatures, the distance between the peaks is higher when the annealing time is 180 min. for almost 2-3° C.

The feasibility of double crystal melting peak creation for PLA has been investigated by the present inventors order to manufacture expanded PLA bead foam (EPLA). Both linear and branched PLA with different crystallizability can produce double crystal melting peak with reasonably high final crystallinity. The second peak appears due to crystal perfection however, the first peak forms during the cooling process after annealing. On the other hand by giving a longer annealing time, the amount of perfected crystals increases as well as the melting peak temperature due to higher degree of crystal perfection.

In addition, Polylactide (PLA) bead foams were produced using a one step manufacturing method during which a double crystal melting peak structure was created. PLA's double crystal melting peak is used for self-diffusion sintering among the bead foams during the molding stage. The sintered beads, through a partial melting of the crystals, are used to produce three-dimensional foamed products with superior mechanical properties.

In sintering technique, the high temperature melting peak crystals formed during the isothermal saturation step in a batch-based bead foaming process are utilized to maintain the bead geometry even at a high temperature required for good. The formation of this crystal melting peak at a higher temperature than the original crystals is due to the crystal perfection induced during the blowing agent saturation stage conducted nearly around the melting temperature. After saturation with the blowing agent, the low temperature melting peak forms during cooling while foaming occurs.

In the steam chest molding process (i.e., in the final processing step to induce sintering of the beads and thereby to produce three-dimensional foam products), the expanded PLA beads are supplied to the mold's cavity. Then high temperature steam, which is between the low temperature melting peak and the newly created high temperature melting peak, is supplied to the mold's cavity to heat the beads. When exposed to this high temperature steam, the low temperature melting peak crystals of the beads will melt. In this way the beads are sintered with each other while the unmolten high temperature melting peak crystals contained in them maintain the bead's overall geometry. The low temperature melting peak crystals will melt, and molecular diffusion will occur between the beads. Consequently, the overall geometry of the beads will be maintained, and the foam products will have a good geometry in the shape of the mold cavity, with outstanding bead sintering formed from the molecular diffusion between the beads. This high-quality sintering of the PLA beads will give the products outstanding mechanical properties.

In the present invention, unfoamed PLA pellets were saturated in a lab-scale autoclave system at elevated temperatures while a physical blowing agent impregnated the pellets. The saturation temperature range for generating the double crystal melting peak structure was determined by the PLA's melting temperature and the amount of dissolved blowing agent in the PLA pellets. The degree of plasticization of the dissolved blowing agent in the PLA pellets varied the saturation temperature range that was required for generating a double crystal melting peak in the PLA foamed beads. The PLA saturation process occurred at various times during which a sufficient amount of high melting temperature-perfect crystals could be formed.

The saturation temperature range used was between 60° C.-180° C. while varying amounts of impregnated blowing agent were used. The impregnation pressure supplied in the chamber was above 70 psi. For the purpose of the present invention, PLA polymers are copolymers with various D-lactide contents. PLA polymers with various types of chain extender and different branching degrees were used. Moreover, PLA polymers compounded with different particles, including nanoparticles, micro-sized additives, fibers, and lubricants were also used. Other options for bead foaming with a double crystal melting peak structure are PLA blends with polyolefins and polyesters. Different types of blowing agents are organic compounds like the hydrocarbons, for example butane and pentane. Then there are volatile blowing agents like $CO_2$. Mixtures of such different blowing agents are also other alternatives.

To suspend the PLA pellets during saturation a suspension medium for example water was used. The suspension medium can be mixed with various suspension stabilizers such as organic or inorganic compounds, which do not dissolve in suspension medium. Various surfactants like silicon oil, for example, could also be applied to the suspension medium as a suspension aid.

The crystallization kinetics (i.e., the nucleation and growth) of the PLA samples can be affected by the saturation temperature, the amount of dissolved blowing agent, and the saturation time. Therefore, generated high melting temperature-perfect crystals can have different crystallization kinetics during the saturation step. Thus, the cell structure and the expansion of the PLA bead foams can be affected by varying crystallization kinetics under different saturation conditions. The changing number of nucleated crystals and their sizes can influence heterogeneous cell nucleation. Varying crystallization kinetics can also affect the PLA's melt strength. The expansion ratios of the foamed PLA beads should be influenced by the varying melting strengths that the different crystallization kinetics causes.

PLA bead foams with a double crystal melting peak structure can be stored at room temperature. The expansion ratios of the PLA bead foams were below 100 times and the cells were dominantly closed. The cell density of the bead foams ranged between $10^6$-$10^{13}$ cells/cm$^3$.

The foamed beads can be sintered during the foam molding process using steam or hot air to produce three-dimensional foam products for various applications such as packaging, insulation, and construction. Sintered beads have superior mechanical properties because the low melting temperature crystals (i.e., the first peak crystals) were melted during the foam molding, and molecular diffusion occurred between the beads. This process contributed to the strong self-sintering action of the foamed beads. On the other hand, the generated high melting temperature-perfect crystals strongly contributed to maintaining the foamed beads' morphology and structure.

Branched PLA pellets were used as an example. The PLA had a D-lactide content of 4.6%. $CO_2$ with a 99.98% purity was also supplied by Linde Gas as the saturation gas.

The branched PLA samples were saturated in the lab-scale autoclave system at temperature ranges of between 115° C.-130° C. and the $CO_2$ pressures of 700 psi-900 psi. Saturation time was varied between 15 min.-60 min.

Figure 9:
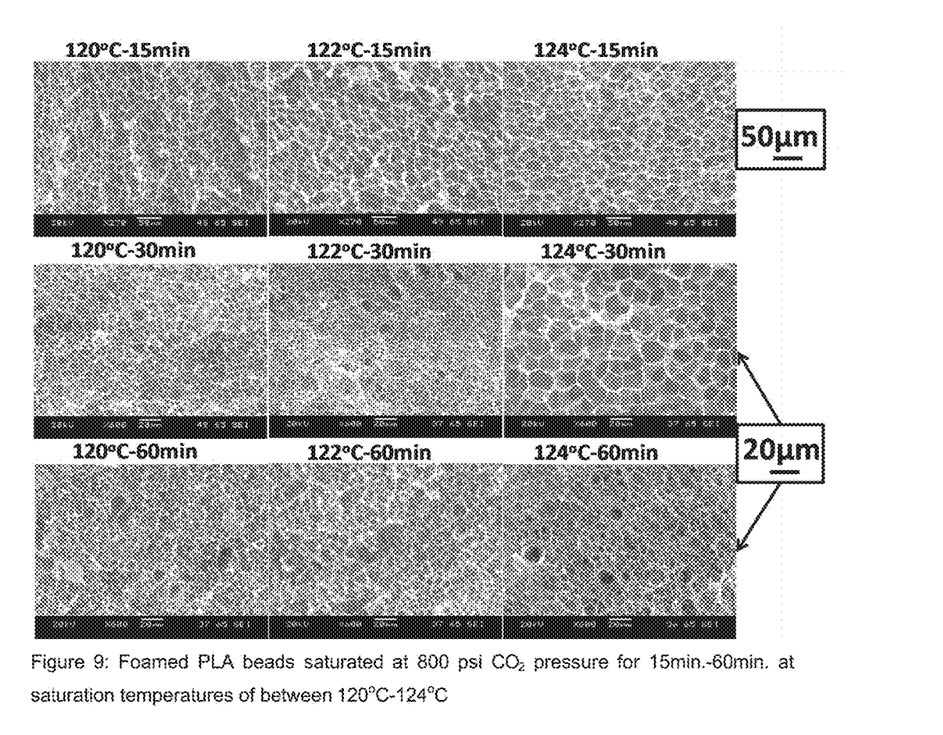
FIG. 9 shows scans of the cell structures of foamed PLA beads saturated at 800 psi C02 pressure for 15 minutes-60 minutes at saturation temperatures of between 120° C.-124° C.

First, the PLA pellets were heated to different saturation temperatures and impregnated with dissolved gas at various saturation times. After saturation, the PLA samples, together with the suspension media, stabilizer, surfactant, and the saturated $CO_2$ gas, were discharged by opening a ball valve, which was located at the bottom of the chamber. The PLA foamed beads were formed by the sudden pressure discharge and cooling. FIG. 9 shows the cell structure of the foamed samples saturated at temperatures of between 120° C.-124° C. $CO_2$ pressure of 800 psi was applied, and the saturation time was between 15 min.-60 min. The foamed beads with a double crystal melting peak structure had expansion ratios of between 5-40 times.

FIG. 9.

The invention claimed is:

1. A method for the moulding of foam beads to form a foam moulding, in which method foamed beads are sintered in the presence of hot air and/or steam, wherein said foamed beads comprise polylactide beads which are chosen from the group of linear polylactide, branched polylactide and polylactide copolymers with D-lactide contents, or combinations thereof, said method comprising a step of supplying expanded polylactide beads to a mold's cavity, which polylactide beads have a double crystal melting peak, a step of supplying high temperature steam to the mold's cavity to heat the beads, which steam has a temperature between a low temperature melting peak and a high temperature melting peak of the double crystal melting peak of the polylactide beads, wherein at said temperature, low temperature melting peak crystals of the polylactide beads melt such that the beads are sintered with each other, while unmolten high temperature melting peak crystals of the polylactide beads do not melt, and thus maintain the bead's overall geometry.

2. A foam moulding formed according to claim 1, comprising sintered polylactide beads.

3. A packaging material, thermal insulation material, sound insulation material, construction material, or cushioning material comprising the foam moulding according to claim 2.

4. The method according to claim 1, wherein an expanded polylactide bead foam is formed which has a double crystal melting peak, in which the distance between the two peaks is in the range of 10° C. 20° C.

5. The method according to claim 1, in which the polylactide beads include one or more additives chosen from the group of chain extender, nanoparticles, micro-sized solid particles, fibers, and lubricants.

6. The method according to claim 1, in which the polylactide beads include polyolefins and/or polyesters.

7. The method according to claim 5, in which the polylactide beads include polyolefins and/or polyesters.

8. A foam moulding formed according to claim 5, comprising sintered polylactide beads.

9. A packaging material, thermal insulation material, sound insulation material, construction material, or cushioning material comprising the foam moulding according to claim 8.

10. A foam moulding formed according to claim 6, comprising sintered polylactide beads.

11. A packaging material, thermal insulation material, sound insulation material, construction material, or cushioning material comprising the foam moulding according to claim 10.

12. A foam moulding formed according to claim 7, comprising sintered polylactide beads.

13. A packaging material, thermal insulation material, sound insulation material, construction material, or cushioning material comprising the foam moulding according to claim 12.

14. A foam moulding formed according to claim 4.

15. A packaging material, thermal insulation material, sound insulation material, construction material, or cushioning material comprising the foam moulding according to claim 14.

* * * * *